US007682243B2

(12) United States Patent
Kim

(10) Patent No.: US 7,682,243 B2
(45) Date of Patent: Mar. 23, 2010

(54) METHOD FOR PROVIDING ONLINE GAME WHICH CHANGES PILOT DATA AND UNIT DATA IN GEAR AND SYSTEM THEREOF

(75) Inventor: Byoung Wook Kim, Kyunggi-do (KR)

(73) Assignee: NHN Corporation, Seongnam-si (KR)

( * ) Notice: Subject to any disclaimer, the term of this patent is extended or adjusted under 35 U.S.C. 154(b) by 524 days.

(21) Appl. No.: 11/570,770

(22) PCT Filed: Jun. 23, 2005

(86) PCT No.: PCT/KR2005/001951

§ 371 (c)(1),
(2), (4) Date: Dec. 17, 2006

(87) PCT Pub. No.: WO2006/001642

PCT Pub. Date: Jan. 5, 2006

(65) Prior Publication Data

US 2007/0207859 A1    Sep. 6, 2007

(30) Foreign Application Priority Data

Jun. 28, 2004  (KR)  ............... 10-2004-0049015

(51) Int. Cl.
*A63F 13/00* (2006.01)
(52) U.S. Cl. ............... 463/23; 463/8; 463/30; 463/31; 463/42
(58) Field of Classification Search .......... 463/8, 463/23, 30, 31, 7, 42
See application file for complete search history.

(56) References Cited

U.S. PATENT DOCUMENTS 6,009,458 A * 12/1999 Hawkins et al. ............. 709/203
6,208,357 B1 * 3/2001 Koga et al. .................. 345/473
6,302,792 B1 * 10/2001 Arai et al. ................... 463/23
6,666,764 B1 * 12/2003 Kudo ............................ 463/8
6,705,945 B2 *  3/2004 Gavin et al. ................. 463/31
6,807,521 B1 * 10/2004 Kurosawa et al. ........... 703/22

(Continued)

FOREIGN PATENT DOCUMENTS

JP    2000-350869    12/2000

(Continued)

*Primary Examiner*—James S McClellan
(74) *Attorney, Agent, or Firm*—H.C. Park & Associates, PLC

(57) ABSTRACT

Disclosed are an online game providing method including the steps of: maintaining a unit information database recording unit information on at least one unit, in which the unit information includes at least one piece of unit ability information and sync point information; maintaining a pilot information database recording pilot information on at least one pilot, in which the pilot information includes a unit identifier associated with a pilot, at least one piece of pilot ability information and unit ability information associated with the pilot ability information; receiving updating request information on first pilot ability information of a first pilot; searching for unit identifier information associated with the first pilot by referring to the pilot information database; searching for sync point information associated with the searched unit identifier information by referring to the unit information database; and updating and recording first pilot ability information and unit ability information associated therewith in accordance with the searched sync point information, respectively, and a system thereof.

8 Claims, 6 Drawing Sheets

U.S. PATENT DOCUMENTS 7,300,345 B2 * 11/2007 Mifune et al. .................. 463/4

FOREIGN PATENT DOCUMENTS

| JP | 2002-292135 | 10/2002 |
| JP | 2002-374526 | 12/2002 |
| KR | 2001-0091478 | 10/2001 |
| KR | 2002-0009119 | 2/2002 |
| KR | 2003-0021762 | 3/2003 |
| KR | 2003-0090577 | 11/2003 |

* cited by examiner

FIG. 3

UNIT ABILITY INFORMATION

| UNIT IDENTIFIER (301) | UNIT KIND (302) | LEVEL (303) | SYNC POINT (304) | ATP (305) | EVP (306) | DEF (307) | HTP (308) |
|---|---|---|---|---|---|---|---|
| uIDxxxx01 | Evangerion | 52 | 0.8 | 70 | 55 | 65 | 0.62 |
| uIDxxxx02 | Mazinger | 80 | 0.9 | 100 | 78 | 94 | 0.88 |
| uIDxxxx03 | TaekwonV | 34 | 0.1 | 35 | 12 | 28 | 0.45 |
| uIDxxxx04 | Mazinger | --- | --- | --- | --- | --- | --- |
| --- | --- | --- | --- | --- | --- | --- | --- |

FIG. 4

| PILOT IDENTIFIER (401) | PILOT KIND (402) | GAMER IDENTIFIER (403) | UNIT IDENTIFIER (404) | LEVEL (405) | ABILITY KIND (406) | LEVEL VALUE (407) | UNIT ABILITY (408) |
|---|---|---|---|---|---|---|---|
| pIDxxxx01 | Amuro | karma23 | uIDxxxx01 | 57 | Bp | 80 | ATP |
| | | | | | Rp | 72 | EVP |
| | | | | | Fp | 90 | DEF |
| | | | | | Cp | 95 | — |
| | | | | | Mp | 66 | HTP |
| gIDxxxx02 | Tin-boy | suezo00 | uIDxxxx02 | 75 | Bp | 55 | ATP |
| | | | | | --- | --- | --- |
| --- | --- | --- | --- | --- | --- | --- | --- |

METHOD FOR PROVIDING ONLINE GAME WHICH CHANGES PILOT DATA AND UNIT DATA IN GEAR AND SYSTEM THEREOF

CROSS REFERENCE TO RELATED APPLICATIONS

This application is a U.S. National Phase Application of International Application PCT Application No. PCT/KR2005/001951 filed on Jun. 23, 2005, which claims the benefit of priority from Korean Patent Application No. 10-2004-0049015 filed on Jun. 28, 2004. The disclosures of International Application PCT Application No. PCT/KR2005/001951 and Korean Patent Application No. 10-2004-0049015 are incorporated herein by reference.

TECHNICAL FIELD

The present invention relates to method and system for providing an online game, and more particularly, to method and system for providing an online game, in which ability information of a unit associated with a pilot is enabled to change as ability information of the pilot changes.

BACKGROUND ART

Today, thanks to development of super high speed data communication networks, a lot of people use the Internet, and a variety of contents services using the Internet are being provided. Among a variety of contents services, particularly, in case of a field of game service, since the development speed and the distribution speed of the service is being improved sharply, a large number of Internet users use online game service via the Internet.

In the online game service, particularly, an online game having two and more player characters controlled by a gamer on a game, for example, an online robot competing game or an online racing game, the gamer may control a player character and a unit (a robot character or a vehicle character) associated therewith through the player character, thereby continuing a game. That is, the gamer can play a game by controlling the player character and the unit. In this game, while the player character and the unit move by control of the same gamer, the player character and the unit operate as independent objects, respectively. For example, while the ability of the player character grows, the ability of the unit does not change. That is, results by operations of the player character do not affect the unit associated with the player character, and a gamer may control each operation for making the two objects grow, thereby making the player character and the unit grow. Thus, there is a problem that convenience is not provided that a gamer controls a player character and a unit in an online game. Also, there is a problem that configuration of a game is not diversified since player characters and units operate independently, and it is difficult to induce interests of a gamer about a game since the gamer continues the game without recognizing a connection between objects.

Accordingly, there is required the appearance of new online game providing method and system, which can provide convenience to a gamer in playing a game by providing a connection between a plurality of player characters controlled by the gamer, and diversify configuration of a game through the connection between the player characters, thereby optimizing interests of the gamer about the game.

DISCLOSURE OF INVENTION

Technical Goals

The present invention is conceived to solve the aforementioned problems in the prior art. Thus, the present invention provides method and system for providing an online game, in which a pilot and unit information associated with the pilot interoperate, thereby changing.

Also, an object of online game providing method and system such above is to enable a gamer to recognize that objects controlled by the gamer are divided into two objects, and thereby play a game.

Also, an object of online game providing method and system such above is to make the growth of a pilot affect the growth of a unit and enable a gamer to recognize a connection between the pilot and the unit, thereby providing convenience when the gamer plays a game.

Also, an object of online game providing method and system such above is to transmit the style of a pilot to a unit through interrelation therebetween, thereby enhancing interests about a game.

Also, an object of online game providing method and system such above is to apply a variety of game scenarios through the diversified combination of a pilot and a unit, thereby enhancing interests about a game.

Technical Solutions

In order to achieve the above goals and solve the problems in the prior art, according to an aspect of the present invention, there is provided a method for providing an online game, the method including the steps of: maintaining a unit information database recording unit information on at least one unit, in which the unit information includes at least one piece of unit ability information and sync point information; maintaining a pilot information database recording pilot information on at least one pilot, in which the pilot information includes a unit identifier associated with a pilot, at least one piece of pilot ability information and unit ability information associated with the pilot ability information; receiving updating request information on first pilot ability information of a first pilot; searching for unit identifier information associated with the first pilot by referring to the pilot information database; searching for sync point information associated with the searched unit identifier information by referring to the unit information database; and updating and recording first pilot ability information and unit ability information associated therewith in accordance with the searched sync point information, respectively.

Also, according to another aspect of the present invention, there is provided a system for providing an online game, the system including a unit information database recording unit information on at least one unit, in which the unit information includes at least one piece of unit ability information and sync point information; a pilot information database recording pilot information on at least one pilot, in which the pilot information includes a unit identifier associated with a pilot, at least one piece of pilot ability information and unit ability information associated with the pilot ability information; an updating request receiving module receiving updating request information on first pilot ability information of the pilot; an information search module searching for unit identifier information associated with the pilot by referring to the pilot information database, and searching for sync point information associated with the searched unit identifier information by referring to the unit information database; and a database updating unit updating and recording first pilot ability information and unit ability information associated therewith in accordance with the searched sync point information, respectively.

Explanation of Terms used in the Present Specification

1) Pilot

A pilot used in the present specification is a player character representing a gamer who imports his/her feelings in a game to continue the game. The gamer may control motions of a unit through the pilot.

2) Unit

A unit used in the present specification is an object operated by a control of a gamer, and the unit may be an object for continuing a game substantially, for example, a robot character. The unit may be a target for the gamer to import his/her feelings. Also, a concept of item belonging to the gamer may be applied to the unit.

3) Sync Pipe

A sync pipe used in the present specification is a conceptive synchronizer enabling the pilot ability information and unit ability information associated therewith to interoperate, thereby causing numerically identical rise effects, in case that pilot ability information changes.

4) Database

A unit information database or a pilot information database used in the present specification is a kind of databases, and the "database" is a group of data systematically recorded in a recording device such that relation between data can be easily grasped.

An online game providing system described as an illustrative example in the present invention provides an online-based game, particularly, an online RPG (Roll Playing Game) that continues a game through a pilot and a unit associated with the pilot. This is for convenience of description. Only, it will be apparent to those of ordinary skills in the related art that the technical spirits of the present invention may be applied to not only an online RPG but also an online racing game in which a game makes progress through two and more player characters.

BRIEF DESCRIPTION OF DRAWINGS

FIG. 3 is a diagram illustrating an example of internal configuration of a unit information database according to an embodiment of the present invention;

FIG. 4 is a diagram illustrating an example of internal configuration of a pilot information database according to an embodiment of the present invention;

BEST MODE FOR CARRYING OUT THE INVENTION

Hereinafter, method and system enabling information of a unit associated with a certain pilot to interoperate and change as ability information of the pilot changes in an online game according to an exemplary embodiment of the present invention will be described with reference to the accompanying drawings.

Figure 1:
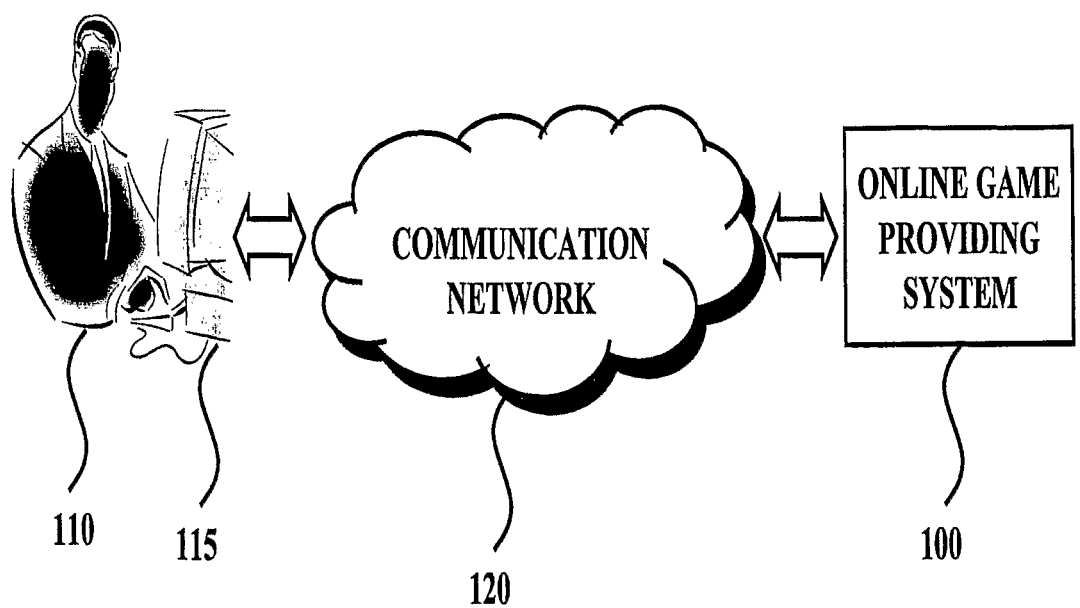
FIG. 1 is a diagram illustrating a network connection of an online game providing system according to the present invention.

FIG. 1 is a diagram illustrating a network connection of an online game providing system according to the present invention.

An online game providing system 100 is connected to a gamer terminal 115 via a communication network 120. In case that a change of ability information on a pilot is required by a motion of the pilot or a unit controlled by a gamer 110, the online game providing system 100 enables the pilot ability information and unit ability information associated therewith to interoperate and change through sync pipes.

The gamer 110 is connected to the online game providing system 100 via the communication network 120, and may have the terminal 115 to access the communication network 120. The gamer 110 controls motions of at least one pilot, thereby continues a game. Ability information on pilots may be changed by the motion control.

The gamer terminal 115 maintains an access with the online game providing system 100 via the communication network 120 such as the Internet, and makes an online game progress by receiving a predetermined program for a game progress from the online game providing system 100. Also, the gamer terminal 115 is a device provided with hardware and/or software accessible to a wireless network, such as a notebook, a PDA, a cellular phone, and the like, and a concept including not only currently used devices but also devices having a function of accessing the wireless network, that is, devices used in the future.

Figure 2:
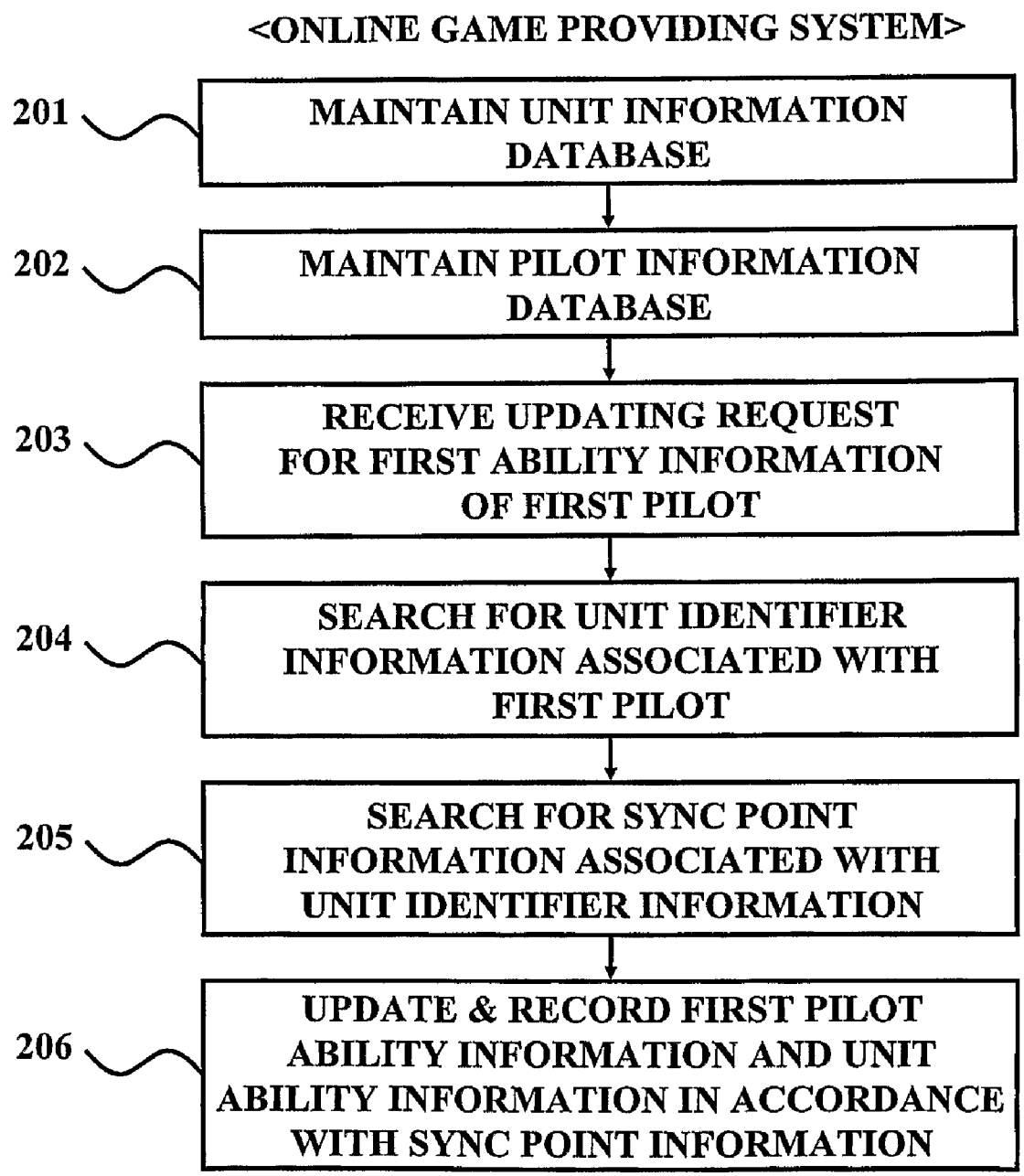
FIG. 2 is a flowchart illustrating a method enabling unit ability information to interoperate and change as pilot ability information changes in an online game according to the present invention.

FIG. 2 is a flowchart illustrating a method enabling unit ability information to interoperate and change as pilot ability information changes in an online game according to the present invention. An online game providing method according to the present embodiment is performed by the online game providing system 100.

In step S201, a unit information database is maintained. The unit information database records information on at least one unit. The unit information includes at least one piece of unit ability information and sync point information. The unit information database serves to maintain information of a corresponding unit by each unit. Hereinafter, the unit information database will be in detail described with reference to FIG. 3.

FIG. 3 is a diagram illustrating an example of internal configuration of a unit information database according to an embodiment of the present invention.

As illustrated in FIG. 3, a unit information database 300 may include fields for a unit identifier 301, a unit kind 302, a level 303, a sync point 304, and an attack power (ATP) 305, an evasion power (EVP) 306, a defense power (DEF) 307, and a hit power (HTP) 308 indicating ability information of a unit.

The unit identifier 301 indicates identifier information identifying a unit that substantially continues a game in an online game in accordance with a control of a gamer.

The unit kind 302 indicates information on a kind of units, and there may be difference in performance ability according to a control of a gamer for each unit kind.

The level 303 indicates level information of a corresponding unit, and may increase or decrease as a result of a motion of the unit in an online game, and be recorded.

The sync point 304 is information indicating a numeric relationship between a unit and its associated pilot, that is, information indicating a ratio or proportion of which changes in pilot ability information are applied to unit ability information. The sync point 304 may be indicated as numerical value information having a value between 0 and 1. When pilot ability information changes, the unit ability information is proportionally changed by referring to the sync point 304 and is recorded in the unit information database 300. The sync point 304 may increase depending on whether an action of the unit is successful or not, and may be recorded. A limit point about a limit to which the sync point 304 may increase may be set up by a system operator. The limit point may be set up differentially in accordance with the unit kind 302 or a pilot kind 402.

The attack power (ATP) 305, the evasion power (EVP) 306, the defense power (DEF) 307, and the hit power (HTP) 308 are information indicating ability information of a unit, and may be stored in association with brave point (Bp), react point (Rp), faith point (Fp), and mentality point (Mp) of a pilot, respectively.

In step S202, a pilot information database is maintained. The pilot information database records information on at least one pilot. The pilot information includes a unit identifier associated with a pilot, at least one piece of pilot ability information and unit ability information associated with the pilot ability information. The pilot information database serves to maintain information of a corresponding pilot by each pilot. Hereinafter, the pilot information database will be in detail described with reference to FIG. 4.

FIG. 4 is a diagram illustrating an example of internal configuration of a pilot information database according to an embodiment of the present invention.

As illustrated in FIG. 4, a pilot information database 400 may include fields for a pilot identifier 401 associated with a pilot, a pilot kind 402, a gamer identifier 403, a unit identifier 404, a level 405, an ability kind 406, an ability value 407, and a unit ability 408.

The pilot identifier 401 indicates identifier information for identifying a pilot in an online game, and may be stored in correspondence to the gamer identifier 403 controlling the pilot.

The pilot kind 402 indicates information on a kind of pilots, and there may be difference in performance ability according to a control of a gamer for each pilot kind.

The gamer identifier 403 indicates identifier information for identifying a gamer controlling a motion of a pilot, and may be composed of information such as a gamer name or a gamer ID (identifier) through which the gamer can be identified.

The unit identifier 404 indicates identifier information for identifying a unit operating as a gamer controls a pilot in an online game, and may be stored in correspondence to the pilot identifier 403.

The level 405 indicates level information of a corresponding pilot, and may increase as a result of a motion of the pilot in an online game and be recorded. In case that the level 405 of the pilot increases and is recorded, information on the sync point 304 associated with the pilot may increase and be recorded.

The ability kind 406 indicates a kind of ability information belonging to a corresponding pilot, and may include information on brave point (Bp), react point (Rp), faith point (Fp), capacity point (Cp), and mentality point (Mp). Information on the brave point (Bp) records the braveness of a pilot in a numerical value, and is associated with information on the attack power (ATP) 305 of a unit. Information on the react point (Rp) records agility or reaction of a pilot in a numerical value, and is associated with information on the evasion power (EVP) 306 of a unit. Information on the faith point (Fp) records faith about the pilot itself in a numerical value, and is associated with the defense power (DEF) 307 of a unit. Information on the capacity point (Cp) records potential capacity of a pilot in a numerical value, and may not be associated with any ability information of a unit. Information on the mentality point (Mp) records a mental ability of a pilot in a numerical value, and is associated with information on the hit power (HTP) 308 of a unit.

The ability value 407 indicates numerical value information with respect to information on the ability kind 406 of each pilot. Each ability value 407 may be changed and recorded in accordance with a motion of each pilot.

The unit ability 408 indicates ability information of a unit associated with information on the ability kind 406 of each pilot. As information on the ability value 407 of the pilot changes, the unit ability 408 information recorded in the unit information database 300 may be changed and recorded. For example, when the brave point (Bp) information among abilities of a pilot increases and is recorded, the attack power (ATP) information of a unit may be also increased and stored.

Sync point information of a unit may be adjusted upwards and recorded, in case that a first pilot recorded in the pilot information database 400 and a unit identifier associated with the first pilot satisfy the combination of predetermined pilot/unit. The combination may be generated by using information on a kind of pilots and a kind of units.

For example, in case that a limit point selected by a system operator is 0.5 and a predetermined combination of pilot/unit is "Tin-boy/Mazinger and Amuro/Evangerion", the combination of pilot/unit of a pilot having pilot identifier "pIDxxxx01" recorded in the pilot information database 400 is included in the predetermined combination of "Amuro/Evangerion." Thus, sync point information of unit identifier "uIDxxxx01" associated with the pilot identifier "pIDxxxx01" may be recorded to be a value (0.8) more than the limit point "0.5."

Also, since a variety of game scenarios are applied in accordance with the predetermined combination of pilot/unit, a gamer can continue an exciting game. The predetermined combination of pilot/unit may be determined by a system operator to be, for example, "Kwanwoo/Jeoktoma," "Cheolsoo/TaekwonV," "Tin-boy/Mazinger," "Amuro/Evangerion," etc. Respectively different game progresses are variously enabled in accordance with each combination.

Figure 5:
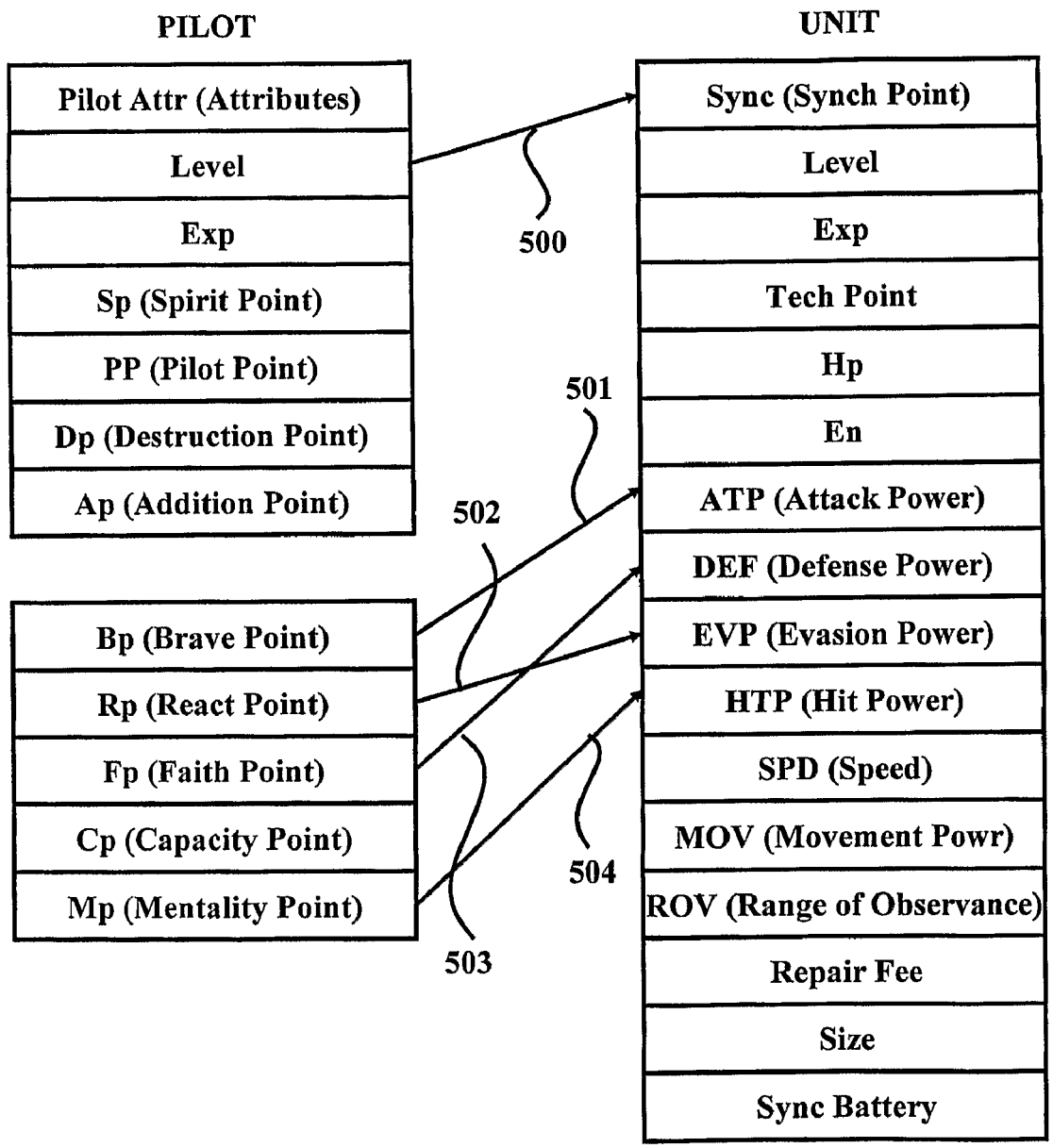
FIG. 5 is a diagram illustrating an example of sync pipes of a pilot and a unit according to an embodiment of the present invention.

FIG. 5 is a diagram illustrating an example of sync pipes of a pilot and a unit according to an embodiment of the present invention.

As illustrated in FIG. 5, pilot ability information and unit ability information may be conceptually linked through sync pipes 500, 501, 502, 503, and 504, and be numerically adjusted proportionally to one another, and recorded. Level information of a pilot is associated with sync point information of a unit through the sync pipe 500, and in case that the pilot level information goes up, the ability information of a unit linked to the corresponding pilot through the sync pipe 500 goes up proportionally according to the ratio stored in the sync point 304. Brave point (Bp) information indicating an ability of a pilot is associated with and linked to attack power (ATP) information of a unit through the sync pipe 501, react point (Rp) information is associated with and linked to evasion power (EVP) information of the unit through the sync pipe 502, faith point (Fp) information is associated with and linked to defense power (DEF) information of the unit through the sync pipe 503, and mentality point (Mp) information is associated with and linked to hit power (HTP) information of the unit through the sync pipe 504, respectively. In case that pilot's ability information goes up, the associated unit's associated ability information also goes up proportionally. The sync pipes 500, 501, 502, 503, and 504, are not physical connections but conceptual associations.

Also, the present invention may further include a Support Manbow of a pilot such as a pet unit that accompanies a robot unit as another unit of the pilot, and helps a game progress. Ability information of the Support Manbow may also interoperate with change of ability information of the pilot and change. That is, at least one unit interoperating with ability information of the pilot may be included.

In step 203, updating request information with respect to first pilot ability information of a first pilot is received. In case that updating request information is received, numerical value information is further received. In interoperation with the numerical value information, the first pilot ability information and unit ability information associated therewith may be further updated.

In step 204, unit identifier information associated with the first pilot is searched by referring to the pilot information database, and in step 205, sync point information associated with the searched unit identifier information is searched by referring to the unit information database.

In step 206, first pilot ability information and unit ability information associated therewith are updated and recorded, respectively, in accordance with the searched sync point information. A method of updating the first pilot ability and the unit ability will be described with reference to FIG. 6.

Figure 6:
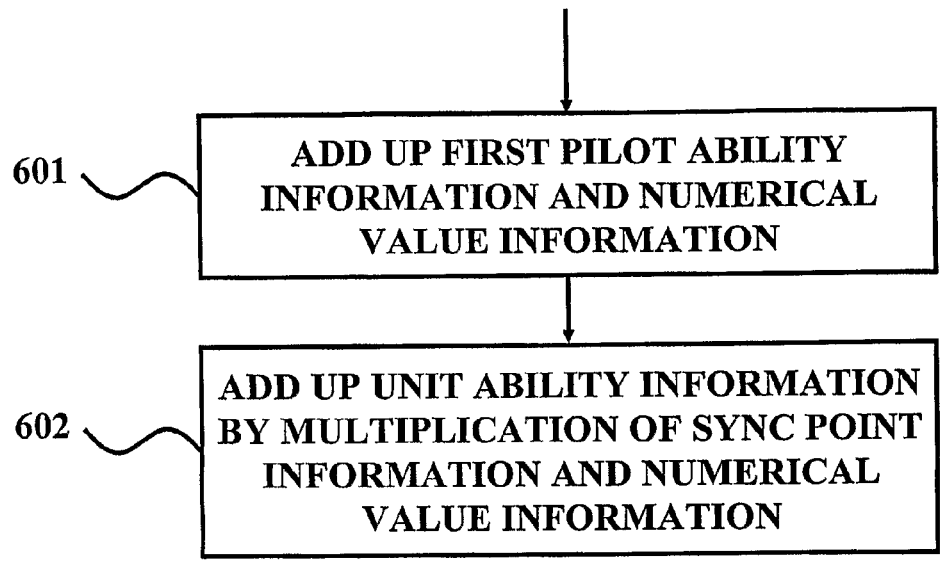
FIG. 6 is a diagram illustrating an example of a method of updating pilot ability information and unit ability information according to an embodiment of the present invention.

FIG. 6 is a diagram illustrating an example of a method of updating pilot ability information and unit ability information according to an embodiment of the present invention.

As illustrated in FIG. 6, in step 601, the method of updating first pilot ability information and unit ability information adds up first pilot ability information and numerical value information to be updated. The added up first information may be recorded as first pilot ability information to be updated. In step 602, the method adds up unit ability information by the multiplication of sync point information and the numerical value information. The added up second information may be recorded as ability information of a unit associated with the first pilot ability information.

For example, when a request is received to increase "brave point (Bp)"information of a pilot having pilot identifier information of "pIDxxxx01," by numerical value, "10", unit identifier information associated with the pilot identifier "pIDxxxx01" is searched by referring to the pilot information database 400. As seen in FIG. 4, the unit identifier associated with pilot identifier "pIDxxxx01" is "uIDxxxx01". Thus, in this example, the conceptual idea of a sync pipe is embodied by a pointer pointing to a unit identifier associated with a pilot identifier. Next, sync point information of the unit having the unit identifier "uIDxxxx01"is accessed by referring to data associated with unit identifier "uIDxxxx01" in the unit information database 300. In this case, the sync point information associated with unit identifier "uIDxxxx01" is 0.8. This, numerical value of "brave point (Bp)"information of the pilot is updated, while the "attack power (ATP)" information of the associated unit is proportionally updated by referring to the sync point information (0.8). For example, where the numerical value of "brave point (Bp)" information for pilot identifier "pIDxxxx01" is "80" and this value is to be increased by "10", the updated numerical value of this pilot's "brave point (Bp)"information is "90". Also, a numerical value of "attack power (ATP)" information of the associated unit "uIDxxxx01" is increased by a proportion of the amount added to the "brave point (Bp)" information of pilot identifier "pIDxxxx01" In this case, the increase to the "brave point (Bp)" of pilot identifier "pIDxxxx01" was "10" and the sync point information associated with unit identifier "uIDxxxx01" is "0.8", the proportional increase of the "attack power (ATP)" of unit identifier "uIDxxxx01" is determined by multiplying "0.8" by "10" to get "8". Therefore, the new "attack power (ATP)" for unit identifier "uIDxxxx01" is found by adding the previous value of "70" (as seen in FIG. 3) and the proportional increase of "8" to get "78". The updated "78" is recorded.

Figure 7:
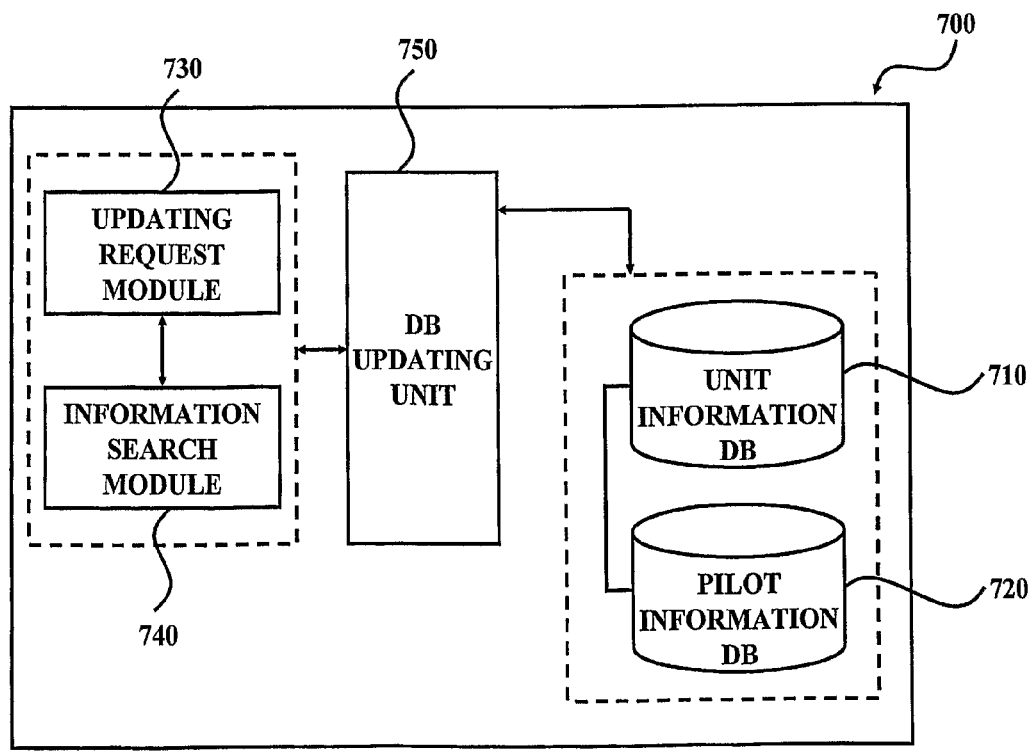
FIG. 7 is a diagram illustrating a configuration module of a system enabling unit ability information to interoperate and change as pilot ability information changes in an online game according to an embodiment of the present invention.

FIG. 7 is a diagram illustrating a configuration module of a system enabling unit ability information to interoperate and change as pilot ability information changes in an online game according to an embodiment of the present invention.

An online game providing system 700 according to the present invention includes a unit information database 710, a pilot information database 720, an updating request receiving module 730, an information search module 740, and a database updating unit 750.

The unit information database 710 records unit information on at least one unit. The unit information includes at least one piece of unit ability information, synch point information, and level information. In case that pilot ability information changes, the sync point information is used to change unit ability information associated with the pilot ability information, and is numerical value information having a value between 0 and 1.

The pilot information database 720 records pilot information on at least one pilot. The pilot information includes a unit identifier associated with a pilot, at least one piece of pilot ability information, unit ability information associated with the pilot ability information, and pilot level information. In case that the level information increases and is recorded, sync point information of the unit interoperates, is increased and recorded.

The updating request receiving module 730 receives an updating request with respect to first pilot ability information of a pilot. In case that an updating request is received, numerical value information to be updated is further received. The numerical value information is used to update pilot ability information and the unit ability information at the database updating unit 750.

The information search module 740 searches for unit identifier information associated with the pilot by referring to the pilot information database 720, and searches for sync point information associated with the searched unit identifier information by referring to the unit information database 710. Also, the information search module 740 searches for sync point information of a unit by taking the unit identifier information as a pointer, and transmits the searched sync point information to the database updating unit 750.

The database updating unit 750 updates first pilot ability information and unit ability information associated with the first pilot ability information in accordance with the searched sync point information, and records. The first pilot ability information is added up to the numerical value information received at the updating request receiving module 730, and updated. The unit ability information is added up by the multiplication of the sync point information and the numerical value information.

The embodiments of the present invention include computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Figure 8:
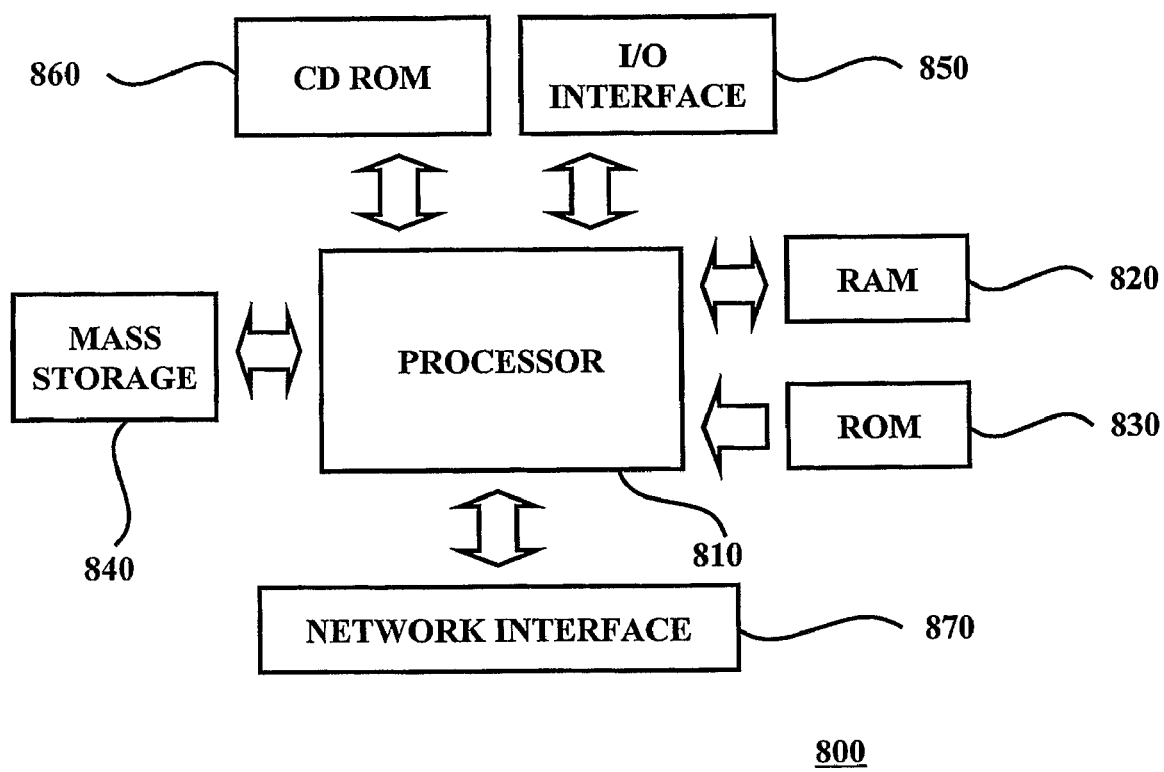
FIG. 8 is an internal block diagram of a general purpose computer which may be employed in implementing the online game providing method according to the present invention.

FIG. 8 is an internal block diagram of a general purpose computer which may be employed in implementing the online game providing method according to the present invention.

A computer apparatus 800 includes at least one processor 810 connected to a main memory device including a RAM (Random Access Memory) 820 and a ROM (Read Only Memory) 830. The processor 810 is also called as a central processing unit CPU. As well-known to the field of the art, the ROM 830 unidirectionally transmits data and instructions to the CPU, and the RAM 820 is generally used for bidirectionally transmitting data and instructions. The RAM 820 and the ROM 830 may include a certain proper form of a computer readable recording medium. A mass storage device 840 is bidirectionally connected to the processor 810 to provide additional data storage capacity and may be one of the computer readable recording medium. The mass storage device 840 is used for storing programs and data and is an auxiliary memory. A particular mass storage device such as a CD ROM 860 may be used. The processor 810 is connected to at least one input/output interface 850 such as a video monitor, a track ball, a mouse, a keyboard, a microphone, a touch-screen type display, a card reader, a magnetic or paper tape reader, a voice or hand-writing recognizer, a joy stick, and other known computer input/output unit. The processor 810 may be connected to a wired or wireless communication network via a network interface 870. The procedure of the described method can be performed via the network connection. The described devices and tools are well-known to those skilled in the art of computer hardware and software.

The described hardware devices may be formed to be operated by at least one software module in order to perform the operations of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching.

Although the present invention has been described in connection with the embodiment of the present invention illustrated in the accompanying drawings, it is not limited thereto since it will be apparent to those skilled in the art that various substitutions, modifications and changes may be made thereto without departing from the scope and spirit of the invention.

As used in this application, the term "module" is intended to refer to, but is not limited to, a software or hardware component, which performs certain tasks. A module or component may advantageously be configured to reside on the addressable storage medium and configured to execute on one or more processors. Thus, a module or component may include, by way of example, components. such as software components, object-oriented software components, class components and task components. processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include"and not as "required". Many changes, modifications, variations and other uses and applications of the present construction will, however, become apparent to those skilled in the art after considering the specification and the accompanying drawings. All such changes. modifications. variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

INDUSTRIAL APPLICABILITY

According to online game providing method and system enabling a pilot and unit information associate with the pilot to interoperate and change, it is possible to enable a gamer to recognize that objects controlled by the gamer are divided into two objects, and thereby play a game.

Also, according to online game providing method and system enabling a pilot and unit information associate with the pilot to interoperate and change, it is possible to make the growth of a pilot affect the growth of a unit and enable a gamer to recognize a connection between the pilot and the unit, thereby providing convenience when the gamer plays a game.

Also, according to online game providing method and system enabling a pilot and unit information associate with the pilot to interoperate and change, it is possible to transmit the style of a pilot to a unit through interrelation therebetween, thereby enhancing interests about a game.

Also, according to online game providing method and system enabling a pilot and unit information associate with the pilot to interoperate and change, it is possible to apply a variety of game scenarios through the diversified combination of a pilot and a unit, thereby enhancing interests about a game.

The invention claimed is:

1. An online game providing method for providing a pilot and a unit associated with the pilot at an online game, the method comprising the steps of:

controlling an online game such that a player can manipulate a pilot and a unit associated with said pilot, said pilot being a game character operated by a player, said pilot representing the player, said unit being a virtual object controlled by the player;

maintaining a unit information database, the unit information database recording unit information on said unit, in which the unit information includes ability of said unit and sync point information;

maintaining a pilot information database, the pilot information database recording pilot information on said pilot, in which the pilot information includes a unit identifier indicating said unit associated with said pilot, ability of said pilot and the ability of said unit associated with said pilot;

receiving a request for update on first pilot ability information of a first pilot;

searching for unit identifier information associated with the first pilot by referring to the pilot information database;

searching for sync point information associated with the searched unit identifier information by referring to the unit information database; and updating and recording the first pilot ability information and unit ability information associated therewith in accordance with the searched sync point information such that said ability of unit is changed proportionally to changes in ability of the pilot by referring to said sync point, wherein said sync point information is a ratio of which changes in said ability of pilot are applied to said ability of unit, and said steps of searching for unit identifier information and of searching for sync point information are performed by a processor.

2. The method of claim 1, wherein:
the pilot information database further includes level information of said pilot and said unit; and
the sync point information is increased and recorded as the level information of the pilot is increased and recorded.

3. The method of claim 1, wherein the sync point information is numerical value having a value between 0 and 1.

4. The method of claim 1, wherein the sync point information is adjusted and recorded in case that the first pilot recorded in the pilot information database and a unit identifier associated with the first pilot satisfy a combination of a predetermined pilot/unit.

5. The method of claim 1, wherein the step of receiving request for update on first pilot ability information of a first pilot comprises the step of further receiving numerical value information to be updated; and the step of updating and recording first pilot ability information and unit ability information associated therewith in accordance with the searched sync point information, respectively, comprises the steps of:

adding up the first pilot ability information and the numerical value information; and adding up the unit ability information by the multiplication of the sync point information and the numerical value information.

6. One or more storage media having stored thereon a computer program that, when executed by one or more processors, causes the one or more processors to perform acts including:

controlling an online game such that a player can manipulate a pilot and a unit associated with said pilot, said pilot being a game character operated by a player, said pilot representing the player, said unit being a virtual object controlled by the player;

maintaining a unit information database, the unit information database recording unit information on said unit, in which the unit information includes ability of said unit and sync point information;

maintaining a pilot information database, the pilot information database recording pilot information on said pilot, in which the pilot information includes a unit identifier indicating said unit associated with said pilot, ability of said pilot and the ability of said unit associated with said pilot;

receiving a request for update on first pilot ability information of a first pilot;

searching for unit identifier information associated with the first pilot by referring to the pilot information database;

searching for sync point information associated with the searched unit identifier information by referring to the unit information database; and updating and recording the first pilot ability information and unit ability information associated therewith in accordance with the searched sync point information such that said ability of unit is changed proportionally to changes in ability of the pilot by referring to said sync point, wherein said sync point information is a ratio of which changes in said ability of pilot are applied to said ability of unit.

7. An online game providing system for providing a pilot and a unit associated with the pilot at an online game, the system comprising:

a unit information database, the unit information database recording unit information on at least one unit, in which the unit information includes ability of said unit and sync point information;

a pilot information database, the pilot information database recording pilot information on at least one pilot, in which the pilot information includes a unit identifier indicating said unit associated with said pilot, said pilot being a game character operated by a player, said pilot representing the player, said unit being a virtual object controlled by the player, ability of said pilot and the ability of said unit associated with said pilot;

an updating request receiving module, the updating request receiving module receiving a request for update on first pilot ability information of a first pilot;

an information search module, the information search module searching for unit identifier information associated with the pilot by referring to the pilot information database, the information search module searching for sync point information associated with the searched unit identifier information by referring to the unit information database; and a database updating module, a database updating module updating and recording first pilot ability information and unit ability information associated therewith in accordance with the searched sync point information such that said ability of unit is changed proportionally to changes in ability of the pilot by referring to said sync point,
wherein said sync point information is a ratio of which changes in said ability of pilot are applied to said ability of unit.

8. The method of claim 1, wherein:

the pilot information database further includes biorhythm information; and the sync point information is increased and recorded as the biorhythm information of the pilot is increased and recorded.

* * * * *